United States Patent [19]
Garland et al.

[11] Patent Number: 5,297,476
[45] Date of Patent: Mar. 29, 1994

[54] HEALTH GUARD FAT SKIMMER

[76] Inventors: Charles D. Garland, P.O. Box 472, Harbour, Grace, Nfld., Canada; George Spector, 233 Broadway Rm. 702, New York, N.Y. 10279

[21] Appl. No.: 26,569

[22] Filed: Mar. 5, 1993

[30] Foreign Application Priority Data

May 4, 1992 [CA] Canada ................................. 2067981

[51] Int. Cl.$^5$ .............................................. A47J 43/28
[52] U.S. Cl. .......................................... 99/495; 99/456; 141/331; 141/375; 210/514; 210/533
[58] Field of Search .................... 99/444, 456, 495; 141/331, 375, 343, 344, 340, 363, 364; 210/514, 533, 534, 538, 800, 474, 249, 517; 222/510, 564

[56] References Cited

U.S. PATENT DOCUMENTS

| | | | |
|---|---|---|---|
| 2,583,335 | 1/1952 | Jepson | 222/510 |
| 3,865,023 | 2/1975 | Halvorsen | 141/331 X |
| 4,206,856 | 6/1980 | Lobel et al. | 210/514 X |
| 4,331,189 | 5/1982 | Joyner | 141/331 X |
| 4,389,926 | 6/1983 | Joyner | 210/249 X |
| 4,464,265 | 8/1984 | Joyner | 99/495 X |
| 4,640,185 | 2/1987 | Joyner | 99/444 |
| 4,934,420 | 6/1990 | Radna | 141/375 X |
| 4,942,811 | 7/1990 | Kuhn | 99/495 |
| 5,084,177 | 1/1992 | Keene | 210/514 X |
| 5,199,349 | 4/1993 | Hansen | 99/495 |

FOREIGN PATENT DOCUMENTS 2565807 12/1985 France ................................. 99/495

Primary Examiner—Timothy F. Simone

[57] ABSTRACT

A fat skimmer for separating an unwanted fat liquid from a wanted liquid is provided which consists of a transparent cone shaped jug for storing the unwanted fat liquid and the wanted liquid that is to be separated. The jug has a tapered exhaust conduit formed at a central bottom end through which the wanted liquid will pass by force of gravity. A valve is within the conduit for selectively permitting passage of the wanted liquid through the conduit into a vessel which is positioned below the conduit, while the unwanted fat liquid is retained within the jug.

5 Claims, 1 Drawing Sheet

US Patent   Mar. 29, 1994   5,297,476
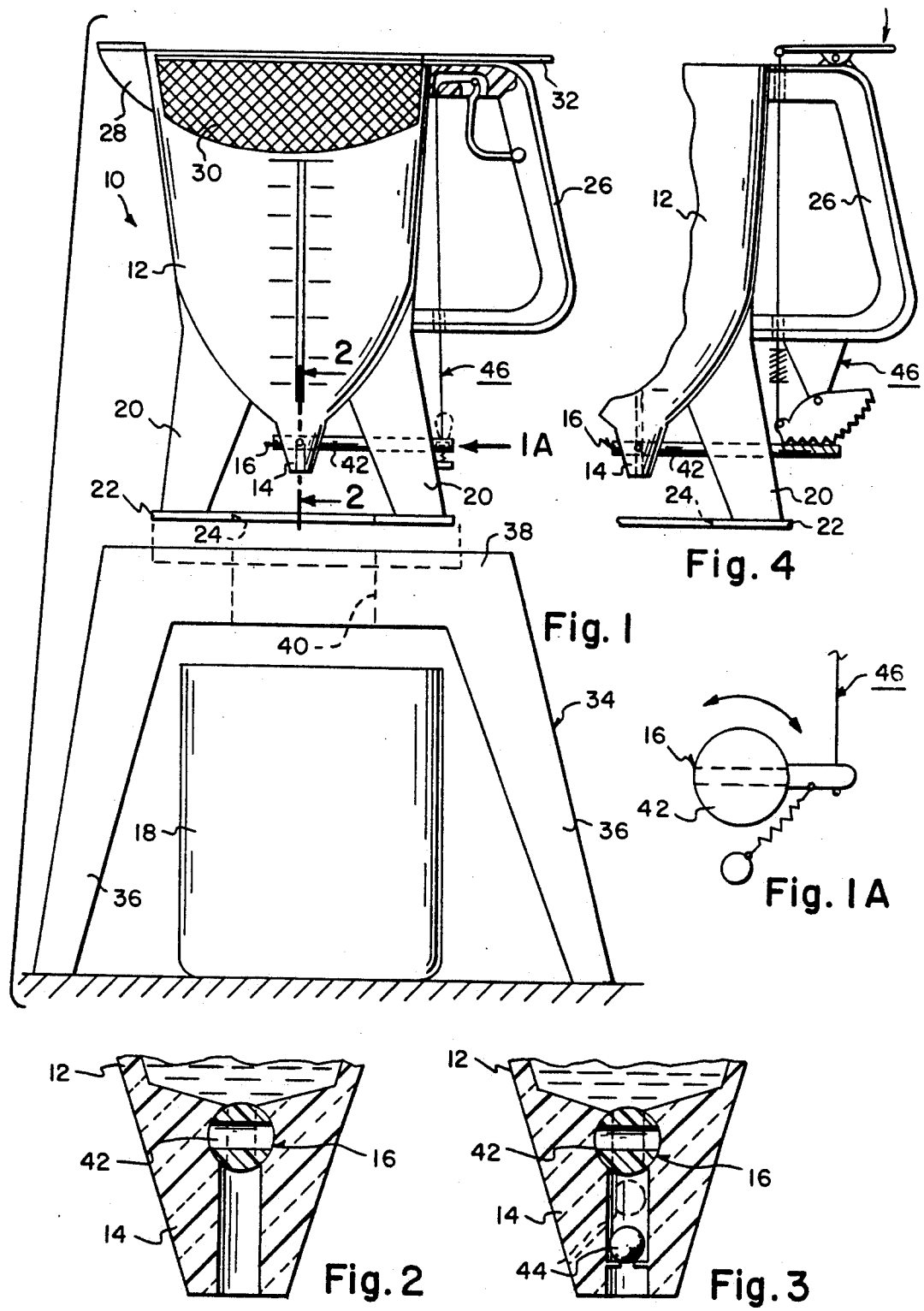

HEALTH GUARD FAT SKIMMER

BACKGROUND OF THE INVENTION

The instant invention relates generally to devices for separating immiscible liquids and more specifically it relates to a fat skimmer which provides a structure for separating two liquids of different weights.

There are available various conventional devices for separating immiscible liquids which do not provide the novel improvements of the invention herein disclosed.

SUMMARY OF THE INVENTION

A primary object of the present invention is to provide a fat skimmer that will overcome the shortcomings of the prior art devices.

Another object is to provide a fat skimmer that is built of a particular structure which will separate fat from cooking juices in a quick, efficient and accurate manner.

An additional object is to provide a fat skimmer that will allow the usable cooking juices to exit from a bottom spout, while a manually operated shut off valve will retain the fat therein to be discarded.

A further object is to provide a fat skimmer that is simple and easy to use.

A still further object is to provide a fat skimmer that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a diagrammatic front elevational view of the instant invention ready to be placed upon the stand.

FIGURE 1A is an end view of the valve taken in direction of arrow 1A in FIG. 1.

FIG. 2 is an enlarged cross sectional view taken along line 2—2 in FIG. 1 through the conduit and the manually operated stop cock valve.

FIG. 3 is an enlarged cross sectional view similar to FIG. 2 showing a normally closed safety valve ball float below the manually operated shut-off valve in the conduit.

FIG. 4 is a diagrammatic front elevational view of a portion of the instant invention showing an alternate construction for the valve in FIG. 1.

DETAILED DESCRIPTION OF THE PREFERRED EMBODIMENTS

Turning now descriptively to the drawings, in which similar reference characters denote similar elements throughout the several views, the FIGURES illustrate a fat skimmer 10 for separating an unwanted fat liquid from a wanted liquid, which consists of a transparent cone shaped jug 12, for storing the unwanted fat liquid and the wanted liquid that is to be separated. The jug 12 has a tapered exhaust conduit 14 formed at a central bottom end through which the wanted liquid will pass by force of gravity. A valve 16 is within the conduit 14 for selectively permitting passage of the wanted liquid through the conduit 14 into a vessel 18 which is positioned below the conduit 14, while the unwanted fat liquid is retained within the jug 12.

The jug 12 includes a plurality of stanchions 20 for supporting the jug 12. A circular base 22 having a central opening 24 is also provided whereby the base 22 is secured to bottom ends of the stanchions 20 with the central opening 24 under the conduit 14, so as to stabilize the jug 12 on a flat surface. A handle 26 is secured to one side thereof and a spout 28 is for pouring the unwanted fat liquid therefrom. A removable strainer 30 with hand grip 32 is placed onto a top of the jug 12 for preventing large solid particles from entering the jug.

The fat skimmer 10 can further contain a stand 34, which consists of a plurality of legs 36 and a top 38 having a central aperture 40. The top 38 supports the base 22, so as to keep the jug 12 with the conduit 14 in a stationary position over the vessel 18 to discharge the wanted liquid into the vessel.

The valve 16 can be a manually operated stop cock valve 42, as best shown in FIG. 2. As shown in FIG. 3, a normally closed safety valve ball float 44 can be placed below the manually operated stop cock valve 42 in the conduit 14. The manually operated stop cock valve 42 can be a normally closed spring loaded thumb/finger activated valve 46, in which two different structures are shown in FIGS. 1, 1A and 4.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A fat skimmer for separating an unwanted fat liquid from a wanted liquid which comprises:
   a) a transparent cone shaped jug with central bottom end for storing the unwanted fat liquid and the wanted liquid that is to be separated, said jug having a tapered exhaust conduit formed at said central bottom end through which the wanted liquid will pass by force of gravity;
   b) a valve within said conduit selectively permitting passage of the wanted liquid through said conduit into a vessel, positioned below said conduit, while the unwanted fat liquid is retained within said jug; wherein said jug includes:
   c) a plurality of stanchions for supporting said jug;
   d) a circular base having a central opening, whereby said base is secured to bottom ends of said stanchions with said central opening aligned with and under said conduit, so as to stabilize said jug on a flat surface;
   e) a handle secured to one side thereof;
   f) a spout for pouring the unwanted fat liquid therefrom; and
   g) a removable strainer with hand grip placed onto a top of said jug for preventing large solid particles from entering said jug.

2. A fat skimmer as recited in claim 1, further including a stand which consists of a plurality of legs and a top having a central aperture aligned with said central opening, whereby said top supports said jug base, so as to keep said jug in a stationary position with said central opening aligned with and over the vessel to discharge the wanted liquid into the vessel.

3. A fat skimmer as recited in claim 2, wherein said valve is a manually operated stop cock valve.

4. A fat skimmer as recited in claim 3, further including a normally closed safety valve ball float below said manually operated stop cock valve in said conduit.

5. A fat skimmer as recited in claim 3, wherein said manually operated stop cock valve is a normally closed spring loaded finger activated valve.

* * * * *